United States Patent [19]

Lundgren

[11] Patent Number: 4,460,289
[45] Date of Patent: Jul. 17, 1984

[54] CLAMP COUPLING
[75] Inventor: Bengt Lundgren, Lerum, Sweden
[73] Assignee: SKF Nova AB, Gothenberg, Sweden
[21] Appl. No.: 283,486
[22] Filed: Jul. 15, 1981
[30] Foreign Application Priority Data
  Sep. 19, 1980 [SE] Sweden ............................. 8006581
[51] Int. Cl.³ ............................................. F16B 2/02
[52] U.S. Cl. ................................... 403/314; 403/374
[58] Field of Search ............... 403/313, 309, 314, 374, 403/370, 371, 366

[56] References Cited
U.S. PATENT DOCUMENTS

| 734,815 | 7/1903 | Cash | 403/314 |
| 2,557,472 | 6/1951 | Rulon | 403/313 |
| 3,550,052 | 12/1886 | Barker | 403/314 |
| 3,958,888 | 5/1976 | Mullenberg | 403/370 X |

FOREIGN PATENT DOCUMENTS

| 51592 | 10/1932 | Norway | 403/371 |
| 704139 | 2/1954 | United Kingdom | 403/370 |

Primary Examiner—Andrew V. Kundrat
Attorney, Agent, or Firm—Eugene E. Renz, Jr.

[57] ABSTRACT

A device for interconnection of two members with cylindrical end portions, comprising a sleeve arranged adjacent both end portions and at least one annular member which by means of axial adjustment along a non-cylindrical section of the sleeve brings about a clamping with a consequent frictional engagement against said cylindrical end portions, whereby forces and torque can be transferred by means of the sleeve interconnecting the members, characterized thereby that the non-cylindrical section of the sleeve consists of a section equipped with threads wherein the profiles of both sides of the thread flanks in longitudinal section define equal angles with the axis of the sleeve, and that said threads cooperate with corresponding threads on two annular members which are arranged in connection to each cylindrical end portion and which are axially displaceable relative to each other and to the sleeve without rotating relative to the sleeve.

5 Claims, 2 Drawing Figures

CLAMP COUPLING

BACKGROUND AND SUMMARY OF THE INVENTION

The invention refers to a device of the type defined in the preamble of the accompanying claim 1.

Such devices are used e.g. for interconnecting two shafts. A previously known device consists of a sleeve with a cylindrical bore, which sleeve is fitted over the end portions of the shafts to be connected. The outer surface of the sleeve is tapering and it is enclosed by an outer sleeve provided with a corresponding tapering bore. As the outer sleeve is pushed up on the taper of the inner sleeve, the inner sleeve will be squeezed against the end portions of the enclosed shafts and thereby form a friction connection that can transfer forces and moments between the shafts.

In order to allow the inner sleeve to obtain an acceptable grip on both shafts it is necessary that the shafts are carefully machined to the same diameter with close tolerences. The use of such a coupling device will therefore be relatively complicated and expensive. As it is necessary to use rather long sleeves in order to obtain a sufficient enclosure surface over both shafts, it is inevitable that the tapering form will mean a rather long radial extension, which is more expensive and space consuming.

In order to minimize the necessary radial space for tapering clamping sleeves, it is earlier known to divide the tapering portions of the sleeves into a plurality of coaxial tapering portions arranged one after the other or to provide the sleeves with complementary helical ramps in the shape of threads the longitudinal sections of the flanks of which having saw-tooth form. In a device intended for interconnecting two shaft ends these steps, however, do not eliminate the need of having close tolerances on the end portions of the shafts to be interconnected.

The purpose of the present invention is to provide a device of the type mentioned hereabove, the components of which are easy to manufacture and to handle and which have small dimensions, and which allows large tolerances on the parts to be connected.

According to the invention, this is achieved with a device the characteristics of which are defined in the accompanying claim 1.

BRIEF DESCRIPTION OF THE DRAWINGS

The invention will hereinafter be further described with reference to the accompanying drawing, in which.

DESCRIPTION OF A PREFERRED EMBODIMENT

Figure 1:
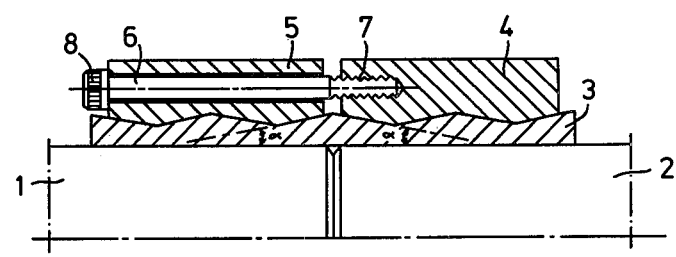
FIGS. 1 and 2 show longitudinal sections through two embodiments of the invention, when used for interconnection of two shafts.

In FIG. 1 is shown the end portions of two cylindrical shafts 1, 2. They are enclosed by a sleeve 3. The shafts preferably meet in the center of the sleeve, which has a cylindrical bore and an envelope surface with one or more threads with a relatively large pitch angle. The profiles of the longitudinal sections of the thread flanks are preferably straight lines, whereby the profiles of the two thread flank sides form equal angles to the axis of the sleeve 3 and thereby, as shown in the figure, with the wall of the cylindrical bore. Two annular members 4, 5, the bores of which are provided with threads corresponding to the threads on the sleeve 3, are screwed onto the sleeve 3 in connection to the end portions of the shafts 1, 2 whereby they will each enclose a shaft. The sleeve 3 is preferably slotted completely or partly in axial direction in order to improve the radial deformability at its clamping against the shafts 1, 2. The clamping is brought about by means of the axial displacement of the rings 4, 5 relative to each other and to the sleeve 3, whereby a sliding occurs in the thread flanks resulting in a wedge action. The axial displacement of the rings 4, 5 can preferably be effected by means of a number of screws 6 arranged in axially threaded bores 7 in the ring 4 and the heads 8 of which are arranged to contact the end surface of the ring 5. When the screws are tightened the rings 4, 5 are pulled toward each other and their thread flanks press against the thread flanks of the sleeve 3, whereby the sleeve is deformed radially inwardly and is brought to a friction engagement with the shafts 1 and 2. The sleeve can thereby transfer the forces and torque from one shaft to the other. The angles are preferably so large that self-retarding is avoided during the frictional contact between the rings 4 and 5 and the sleeve 3. It is thereby ascertained that the clamping force ceases when the screws 6 are loosened. Large angles furthermore result in that the desired radial clamping force is achieved with a comparatively short displacement of the rings 4, 5 on the sleeve 3. The required axial force is achieved by tightening the screws 6 with moderate torque.

The symmetric thread flank profile of the sleeve 3 and the threads of the rings 4 and 5 result in that the threads can be formed rather easily, and the rings can be screwed on and off the sleeve from either direction. When the rings are displaced axially in opposite directions, they will each put load upon their own thread flank, and since there is symmetry, the clamp forces will be equal on both shafts 1, 2. The displacement can occur either by the rings being pulled toward each other or by being pushed away from each other. Desired movements can be achieved by suitable arrangements of screws and threaded screw holes in one or more of the rings 4, 5. Due to the fact that the sleeve 3 has a relatively low resistance to radial deformation, and that the end portions of the shafts 1, 2 are each enclosed in a ring 4, 5, the dimensional tolerances of the shafts can be large without jeopardizing the function of the connection. If, for example, the shaft 1 is smaller than shaft 2, the ring 5 is displaced further on the sleeve 3 than ring 4, when the screws 6 are tightened.

Figure 2:
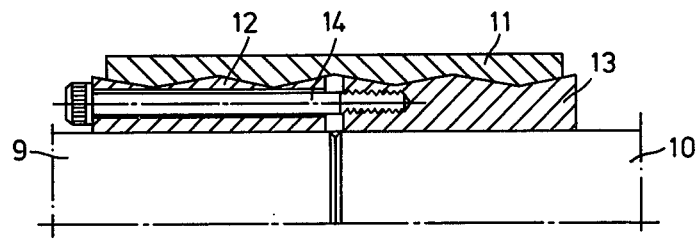

In FIG. 2 is shown an embodiment of the device where two shafts 9, 10 with cylindrical end portions are interconnected with an outer sleeve 11 which displays a bore with threads, which correspond to the threads on the outer surface of the sleeve 3 in FIG. 1. Annular members 12, 13, the outer surfaces of which are equipped with corresponding threads, are arranged in the bore of the sleeve 11 and each one encloses one of the shafts 9, 10 resp. Screws 14 are arranged in the same way as the screws 6 in FIG. 1 for effecting axial displacement of the rings 12, 13, whereby these are deformed radially and clamp against the pertaining shaft. The rings 12, 13 are thereby preferably axially slotted for facilitating the radial deformation. This embodiment allows rather big dimensional differences between the shafts, but a correct coaxial mounting of the shafts is more difficult.

Other embodiments of the invention than those described hereabove are, of course, possible within the scope of the claims. The rings 4, 5 can thus e.g. be equipped with flanges, in which the clamping screws are arranged. Members with cylindrical bores can also be interconnected with a device in accordance with the invention, whereby the sleeve or the annular members will deform radially outwards to contact with its associated bore wall when the annular members are displaced axially.

SUMMARY OF THE INVENTION

The invention refers to a device for the interconnection of for example, two shafts (1,2).

An inexpensive and simple device which allows large shaft diameter tolerances is obtained thereby that an appropriate sleeve (3) encloses the end portions of the shafts. The outer surface of the sleeve is provided with a thread, the longitudinal sections of both sides of the flanks of which describe equally large angles with the axis of the sleeve. Two annular members (4,5) having corresponding threaded bores are arranged on the sleeve in connection to each shaft resp. By axial displacement of the members (4,5) upon the sleeve (3) this is deformed to squeeze against the shaft, whereby a power and torque transferring connection is formed.

What is claimed is:

1. A device for interconnection of two members with cylindrical end portions comprising a sleeve arranged adjacent both end portions and having an outer non-cylindrical surface and an inner cylindrical surface enclosing said members, at least a pair of annular members axially adjustable along said non-cylindrical surface to permit clamping and frictional engagement against said cylindrical end portions, said non-cylindrical surface of said sleeve having threads wherein the profiles of both sides of the thread flanks in longitudinal section define equal angles with the axis of said sleeve, said annular member having at least one surface which threadedly engages said non-cylindrical surface of said sleeve and which are axially displaceable relative to each other and to said sleeve without rotating relative to the sleeve, a plurality of screws arranged in axially threaded bores in one of said annular members and having a portion which cooperates with another annular member of permit relative axial displacement of said members by rotation of said screws.

2. A device for coupling two shaft members having end portions comprising a sleeve having an inner surface directed towards the peripheral surface of the end portions with at least one thread having angularly disposed flanks and an outer surface remote from the members, the profile of each flank of said sleeve thread defining equal angles relative to the axis of said sleeve in longitudinal section and are disposed at a small angle relative to the axis, at least one annular member overlying said shaft members and having at least one thread having angularly disposed flanks which complement and cooperate with said sleeve thread flanks and means for axially displacing said annular member relative to said sleeve without rotating relative thereto whereby the thread flanks on said member slide on the thread flanks of said sleeve to cause a wedging action against said shaft members and produce a coupling effect.

3. A device as claimed in claim 2 wherein said sleeve circumscribes and directly engages said shaft members and said sleeve thread flanks are formed on the outer peripheral surface of said sleeve and wherein the thread flanks of said annular member are formed on the inner peripheral surface and said annular member engages over said sleeve.

4. A device as claimed in claim 2 wherein said annular member circumscribes and directly engages said shaft members and said annular thread flanks are formed on the outer peripheral surface of said annular member and wherein the thread flanks of said sleeve are formed on the inner peripheral surface and said sleeve engages over said annular member.

5. A device as claimed in claim 2 wherein said sleeve and said annular member are provided with a plurality complementary threads.

* * * * *